United States Patent [19]

Gavagan et al.

[11] Patent Number: 4,896,844
[45] Date of Patent: Jan. 30, 1990

[54] DUAL SPOOL RETRACTOR WITH COMFORT LIMITING MECHANISM

[75] Inventors: James A. Gavagan, Centerline; William E. Brennan, Rochester Hills, both of Mich.

[73] Assignee: Irvin Industries, Inc., Auburn Hills, Mich.

[21] Appl. No.: 278,823

[22] Filed: Dec. 2, 1988

Related U.S. Application Data

[63] Continuation-in-part of Ser. No. 110,207, Oct. 19, 1987, abandoned.

[51] Int. Cl.$^4$ .............................................. B60R 22/34
[52] U.S. Cl. .................................. 242/107.7; 280/807
[58] Field of Search ......................... 242/107.7, 107.6; 280/806, 807, 808

[56] References Cited

U.S. PATENT DOCUMENTS

| | | | |
|---|---|---|---|
| 3,973,786 | 8/1976 | Rogers . | |
| 4,002,311 | 1/1977 | Fisher | 242/107.7 |
| 4,034,931 | 7/1977 | Fisher et al. | 242/107.4 D |
| 4,065,070 | 12/1977 | Pilarski et al. | 242/107.4 A |
| 4,149,683 | 4/1979 | Fisher et al. | 242/107.7 |
| 4,164,336 | 8/1979 | Higbee et al. | 242/107.4 A |
| 4,303,209 | 12/1981 | Stephenson | 242/107.4 A |
| 4,307,853 | 12/1981 | Higbee et al. | 242/107.7 |
| 4,337,907 | 7/1982 | Fox | 242/107.7 |
| 4,343,445 | 8/1982 | Ocker et al. | 242/107.7 |
| 4,385,737 | 5/1983 | Gullette et al. | 242/107.7 |
| 4,498,642 | 2/1985 | Doty | 242/107.7 X |

*Primary Examiner*—John M. Jillions
*Attorney, Agent, or Firm*—Reising, Ethington, Barnard, Perry & Milton

[57] ABSTRACT

A dual spool seat belt retractor includes a comfort mechanism actuated by limited protraction of one belt relative to the other to provide a predetermined amount of slack in the one belt. A comfort limiting mechanism is drivingly coupled by a gear train to both the first and second retractor spools to disengage the comfort mechanism in response to relative rotation between the first and second spools caused by protraction of the one belt to an extent exceeding the limited protraction employed to actuate the comfort mechanism so as to allow retraction of the belt by the rewind spring. Slack in the belt in excess of the predetermined amount is thereby prevented. The comfort mechanism is also disengaged by the comfort limiting mechanism when the belts are unbuckled to allow full retraction of both belts.

29 Claims, 9 Drawing Sheets

DUAL SPOOL RETRACTOR WITH COMFORT LIMITING MECHANISM

This application is a continuation-in-part application of copending U.S. patent application Ser. No. 110,207 filed Oct. 19, 1987, now abandoned.

FIELD OF THE INVENTION

The invention relates to a dual spool retractor mechanism for dual belts as used in a safety harness of an automobile, airplane or the like and particularly to a dual spool retractor mechanism having a comfort mechanism to permit the user to provide a predetermined amount of slack in one of the belts and a comfort limiting mechanism to disengage and disable the comfort mechanism to prevent the user from intentionally or inadvertently providing slack greater than the predetermined amount.

BACKGROUND OF THE INVENTION

Typical dual spool retractors are well known in the patent art as shown in the U.S. Pat. Nos. 4,065,070 issued to Regis Pilarski and Gerald Yates and 4,164,336 issued to Wallace Higbee and Robert Rumpf. The retractor spools are spring loaded to apply a return bias constantly seeking to return all loose webbing in the belt to the spool. Comfort mechanisms having means for preventing rewind of a belt are also well known in the retractor art as, for example, the U.S. Pat. Nos. 4,002,311; 4,034,931 and 4,149,683 to Robert C. Fisher and Cecil A. Collins. In such mechanisms, the seat belt user can select a point in the protraction of webbing or belt to prevent the rewind spring from acting on the belt while the belt is in a selected use position. In such comfort mechanisms, withdrawal of the belt from the spool is not impaired so that the occupant can lean forward to adjust his seating position or to reach vehicle controls. However, such comfort mechanisms are known to prevent the rewinding of the belts when otherwise desired; for example, when the seat belt is unbuckled to permit egress of the seat occupant from the vehicle.

Accordingly, U.S. Pat. No. 3,973,786 issued to Lloyd W. Rogers, Jr. provides a device which is responsive to movement of the vehicle door from the closed to the open position as the occupant leaves the vehicle to disengage the comfort mechanism so that the spring may rewind the belt upon the retractor spool.

The Higbee and Kuntzman U.S. Pat. No. 4,307,853 illustrates a dual spool retractor having a rack and pinion mechanism driven by a first spool to allow retraction of a second spool after a predetermined amount of retraction occurs in the first spool driving the rack and pinion. The first spool includes a pinion gear that drives the rack through a gear train. The second spool whose retraction is prevented includes a comfort mechanism with a spring finger that is released by a cam surface on the rack to allow retraction of the second spool after the predetermined amount of retraction of the first spool has occurred. The cam surface on the rack releases the spring finger during belt retraction only.

The Ocker et al U.S. Pat. No. 4,343,445 employs a different mechanism to release the comfort mechanism after a predetermined number of retraction revolutions of one spool. The release mechanism of this patent employs a pivotable release lever to disengage the spring finger of the comfort mechanism and a rotatable cam rotating with the one spool to actuate the release lever. The one spool includes a spur gear driving an idler gear which in turn drives a ring gear on which the cam is carried. The Fox U.S. Pat. No. 4,337,907 includes a similar release mechanism to this same end.

A dual spool retractor of a type different from those of the preceding patents is described in the Stephenson U.S. Pat. No. 4,303,209. The dual spool retractor of this patent includes axially aligned dual spools and a comfort mechanism for reducing retraction force acting on the torso belt.

As explained in an article entitled "Seat-Belt Slack: Comfort Device In U.S. Car Raises Safety Concern" published in *The Wall Street Journal*, July 31, 1987, automobile seat belt systems having a comfort mechanism that allows the user to provide one or more levels of slack (or reduced tension) in the shoulder belt have been criticized as allowing the user, either intentionally or inadvertently, to provide excessive slack in the shoulder belt that impairs the protectiveness of the belt in the event of a crash.

Excessive slack in the shoulder belt can be provided by the user simply by extending or protracting the shoulder belt relative to the lap belt to various extents that actuate the comfort mechanism. The user can actuate the comfort mechanism inadvertently by leaning forward to adjust controls on the dashboard or to pick up an article from the floor.

SUMMARY OF THE INVENTION

The invention contemplates a dual spool retractor for a belt system wherein a first retractor spool has a first belt thereon and has a comfort means actuated by preselected limited protraction of the first belt relative to a second belt on a second retractor spool to provide a predetermined amount of slack in the first belt and wherein a comfort limiting means is operable whenever protraction of the first belt exceeds such limited protraction to disengage the comfort means and permit retraction of the first belt. Slack greater than the predetermined amount is thus prevented. The comfort limiting means is operable whether the first belt is protracted in excess of such limited protraction intentionally or inadvertently by the user.

The invention also contemplates a dual spool retractor for a belt system wherein a first retractor spool has a first belt thereon and wherein a comfort means is actuated by preselected limited protraction of the first belt relative to a second belt on a second retractor spool to provide a repeatable "memorized" comfort setting providing a predetermined amount of slack in the first belt. A comfort limiting means is operable whenever protraction of the first belt relative to the second belt exceeds the aforesaid limited protraction to permit retraction of the first belt back to the comfort setting to provide the predetermined amount of slack therein. The comfort means can be intentionally released by the user by protracting the second belt relative to the first belt to allow the first belt to retract against the torso of the user.

The invention further contemplates a dual spool retractor of the types described above wherein the comfort limiting means also is operable to disengage the comfort means whenever retraction of the second belt relative to the first belt exceeds a preselected limited retraction as a result of unbuckling of the belts from the restraining position around the user to allow both belts to be retracted.

The invention contemplates a dual spool retractor of the types described in the preceding paragraphs wherein the comfort limiting means is operable to release and either disable the comfort means or return the comfort means to the comfort setting when one of the retractor spools rotates relative to the other a selected amount as a result of movement, either protraction or retraction, of one belt relative to the other.

In one typical working embodiment of the invention, the dual spool retractor includes a first rotatable spool means and second rotatable spool means for storing a respective first belt and second belt, means for biasing the first spool means and second spool means in a direction to retract the respective first belt and second belt, comfort means operatively associated with at least the first spool means for actuation by limited protraction of the first belt relative to the second belt to provide a predetermined amount of slack in said first belt, and comfort limiting means for disengaging the comfort means when protraction of the first belt relative to the second belt exceeds said limited protraction to permit retraction of the first belt and thus prevent slack in the first belt greater than the predetermined amount. The comfort limiting means is actuated by a drive train, such as a gear train, drivingly coupled between the first spool means and second spool means and is operable to disengage the comfort means for belt retraction in response to rotation of the first spool means relative to the second spool means caused by protraction of the first belt relative to the second belt to an extent exceeding said limited protraction. The comfort limiting means is preferably also operable to disengage the comfort means and allow retraction of the first belt in response to rotation of the second spool means relative to the first spool means caused by retraction of the second belt relative to the first belt initially when the first and second belts are unbuckled from the restraining position around the user.

Thus, the comfort limiting means is drivingly coupled by the drive train to the first and second spool means and is operable in response to relative rotation between the first spool means and second spool means.

In a particularly preferred version of this working embodiment of the invention, the comfort limiting means includes a release member having a driven planet gear thereon. The driven planet gear is actuated by the drive train to effect rotation of the driven planet gear in a substantially stationary position about its own rotational axis when the first and second spool means are rotated simultaneously by protraction of the first and second belts simultaneously and to effect planetary motion of the driven planet gear about another axis corresponding to a pivot axis of the release member when one of the first and second spool means rotates relative to the other. The planetary motion of the driven planet gear pivots the release member to disengage the comfort means.

In another typical working embodiment of the invention, the comfort means is actuated by a drive train, such as a gear train, drivingly coupled between the first spool means and second spool means for actuation by limited protraction of the first belt relative to the second belt and is operatively associated with the first spool means for establishing a repeatable ("memorized") comfort setting providing a predetermined amount of slack in the first belt at the comfort setting and the comfort limiting means is actuated by the gear train for allowing retraction of the first belt back to the comfort setting in response to rotation of the first spool means relative to the second spool means caused by protraction of the first belt relative to the second belt in excess of the aforesaid limited protraction provided by the comfort setting, thereby establishing a "memorized" comfort setting.

In a particularly preferred version of this working embodiment, the comfort means comprises a ratchet wheel rotatable with the first spool means, a slot rotatable by the gear train in response to rotation of the first spool means relative to the second spool means caused by protraction of the first belt relative to the second belt and a pivotable pawl member between the first and second spool means. The pivotable pawl member includes a cam end engageable in the slot to establish the aforesaid comfort setting and a pawl end engageable with the ratchet wheel on the first spool means to lock the first spool means against rotation in the retraction direction when the cam end is engaged in the slot to establish the comfort setting. The comfort limiting means comprises a peripheral track disposed adjacent the slot for rotation therewith by the gear train and configured to disengage the pawl end from the ratchet wheel (by pivoting the pivotable pawl member) in response to protraction of the first belt relative to the second belt in excess of the comfort setting whereby the first belt will be retracted back to the repeatable comfort setting to provide the aforementioned predetermined amount of slack in the first belt. The track also disengages the pawl end from the ratchet wheel in response to protraction of the second belt relative to the first belt to retract the first and second belts against the torso of the user.

The dual spool retractor of the invention can accommodate different sizes of seat occupants as well as different frontward and rearward seat positions without interference with the operation of the comfort mechanism and comfort limiting mechanism.

BEST MODE FOR PRACTICING THE INVENTION

Figure 1:
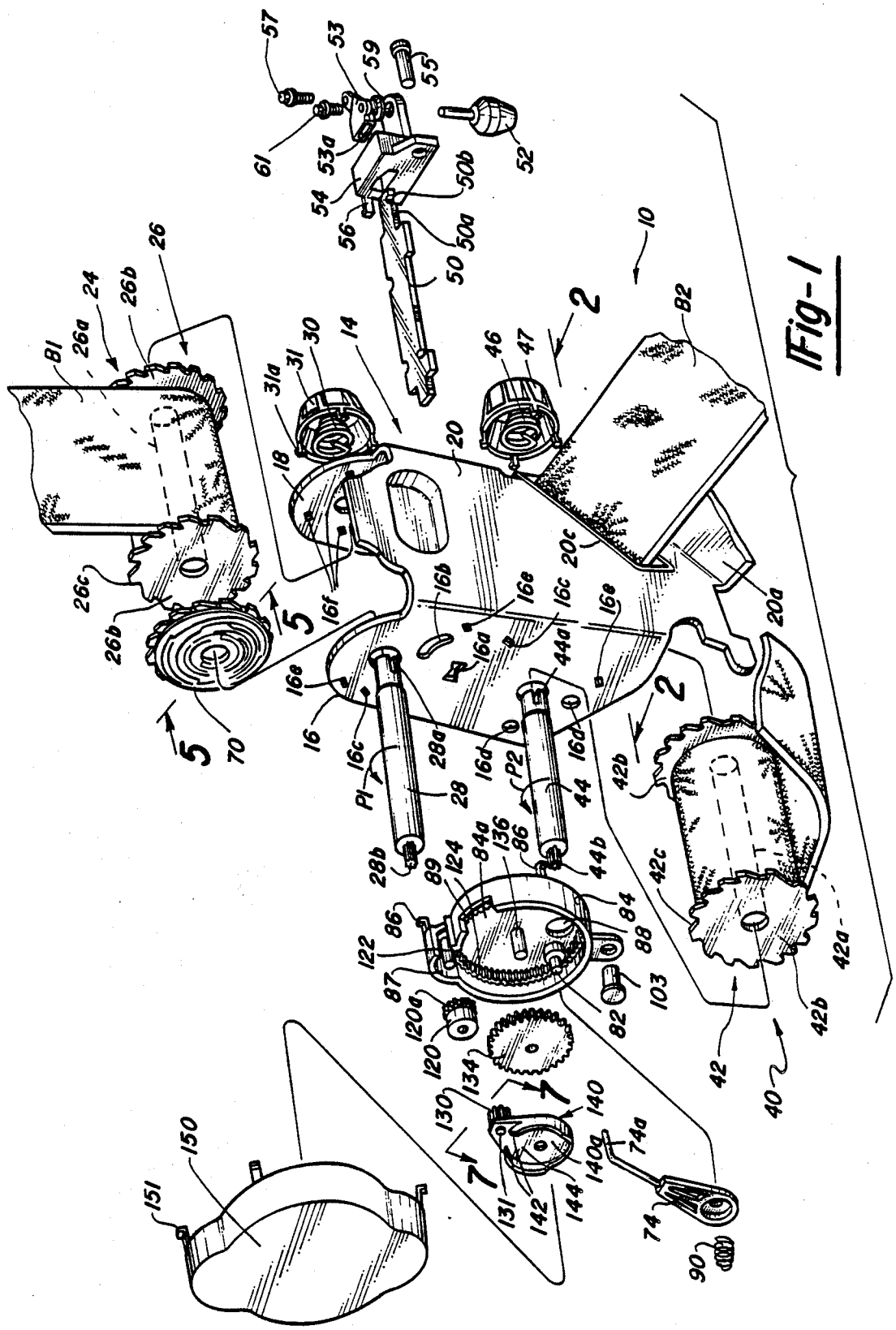
FIG. 1 is an exploded perspective view of a first embodiment of a dual spool retractor of the invention.
Figures 2, 3:
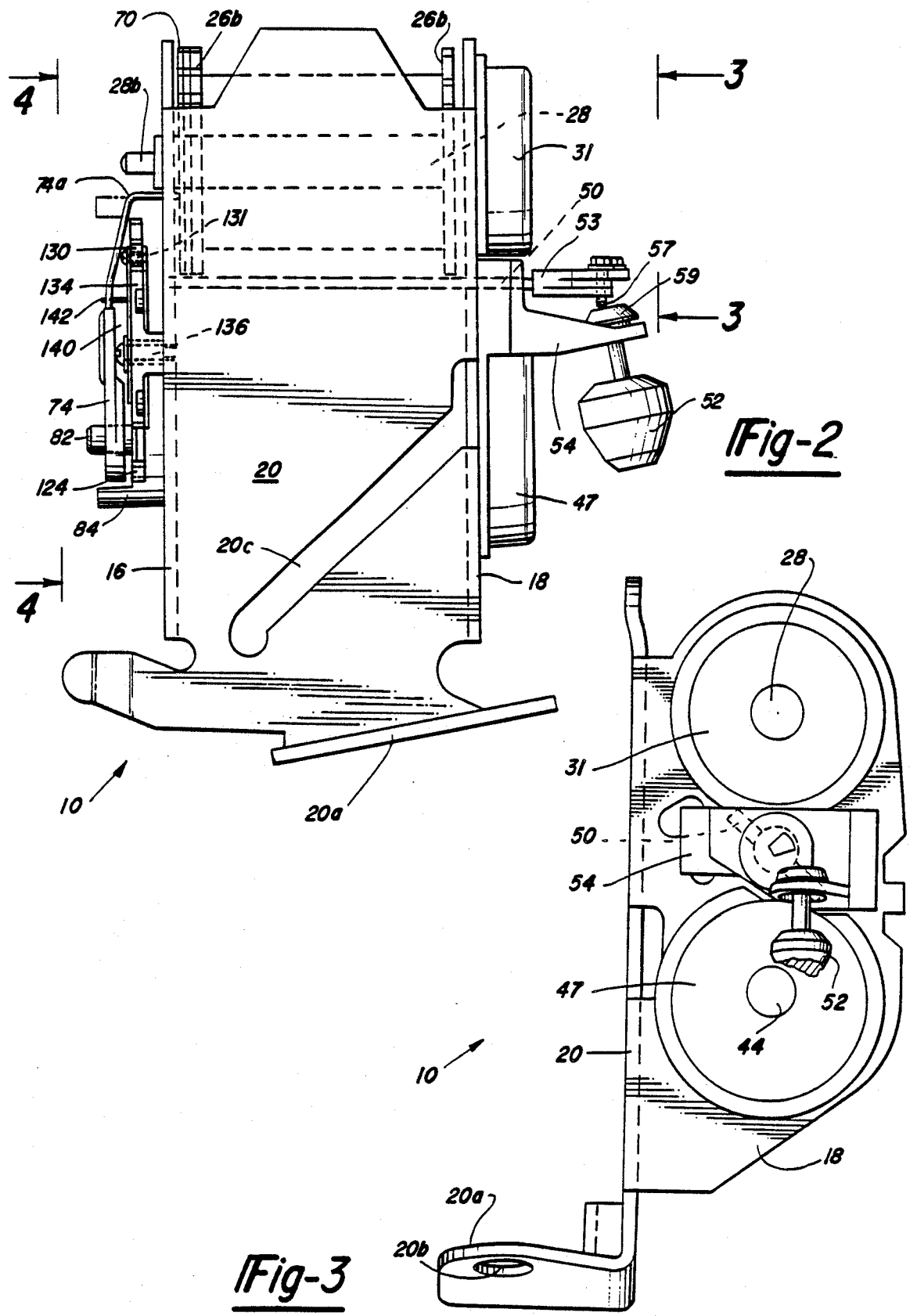
FIG. 2 is an elevation of the retractor of FIG. 1 in the direction of arrows 2—2 with cover 150 removed.
FIG. 3 is an elevation of the retractor in the direction of arrows 3—3 in FIG. 2.

With reference to FIGS. 1-9 and 12, there is shown a dual spool retractor 10 including a U-shaped frame 14 having parallel flanges or walls 16,18 projecting from a central wall 20. Central wall 20 extends downwardly to form a base 20a. Base 20a is fixedly mounted to vehicle body member 15, FIG. 12. Base 20a can be fixedly attached to body member 15 by suitable means such as machine screws or other fasteners. One or more holes 20b are provided in base 20a to this end. Rotatably mounted between walls 16,18 is a first spool means 24 comprising a spool member 26 with hollow hub or tube 26a on which belt B1 is wound and stored and enlarged disc-shaped ends 26b joined fixedly to tube 26a and further comprising shaft 28 on which one or more ends 26b of spool member 26 are mounted by shear fit, press fit or other suitable means for rotation therewith. Shaft 28 itself is rotatably mounted between flanges 16,18 in known fashion. Shaft 28 includes a slotted end 28a that receives one end of flat torsion spring 30. The other end of spring 30 is affixed on cover 31. Cover 31 is in turn affixed to flange 18 in fixed position and to this end includes cover tabs 31a received in openings 16f in flange 18. Spring 30 biases the shaft 28 and spool member 26 in a direction to retract or rewind first belt B1 that constitutes the shoulder or torso belt of an automobile safety harness. First belt B1 is received and stored on spool member 26 in known manner.

A second spool means 40 is also rotatably mounted between flanges 16,18 below the first spool means to receive and store in known fashion a second belt B2 that constitutes the lap belt of an automobile safety harness, e.g., see FIG. 12. Second spool means 40 includes a spool member 42 with hub 42a, ends 42b and ratchet teeth 42c like those on spool member 26. Spool member 42 is mounted on shaft 44 in like manner as spool member 26 for rotation with shaft 44. Shaft 44 is rotatably mounted between flanges 16,18 and includes slotted end 44a that receives one end of flat torsion spring 46. The other end of spring 46 is fastened to cover 47 which in turn is affixed in stationary position to flange 18 in the same manner as cover 31 is fastened thereto. Spring 46 biases shaft 44 and the spool member thereon in a direction to retract or rewind second belt B2.

Each coil spring 30,46 is thus covered by respective cover or cap 31,47 to protect the spring from dirt and damage and to secure ends of springs 30,46 to flange 18.

As shown best in FIG. 1, spool member 26 includes ratchet teeth 26c on enlarged ends 26b thereof. The second spool member on shaft 44 has similar ratchet teeth 42c on similar enlarged ends 42b thereof. A pawl 50 is pivotally mounted between flanges 16,18 with opposite ends thereof received in openings in the flanges (only opening 16a shown) and between first spool means 24 and second spool means 40 for pivoting motion to engage and interlock the ratchet teeth on the spool members during sudden deceleration of the vehicle. To effect such pivoting of the pawl 50, a pendulum 52 is carried on a carrier member or pendulum support 54 by umbrella cap 59 on pendulum 52. Cap 59 transmits pendulum motion through adjusting screw 57 in actuator 53 to pawl 50 causing engagement with ratchet teeth 26c, 42c upon sudden deceleration of the vehicle. Pawl 50 includes an end 50a received in slot 53a in the actuator. Screw 61 extends into slot 53a of the actuator and is received in slot 50b in end 50a of the pawl to retain the actuator and pawl together. Actuator 53 is pivotable with pawl 50 relative to support 54 which is affixed to flange 18 by rivet 55 attached to flange 18 in suitable manner and an integral arm 56 thereon bent into an opening (not shown) in flange 18. Screw 57 contacts cap 59 on pendulum 52 for adjustment purposes. Other conventional pawl mechanisms may be used to engage and lock the ratchet teeth of the spool members to effect emergency locking of spool means 24,40 and thus belts B1,B2.

Figure 12:
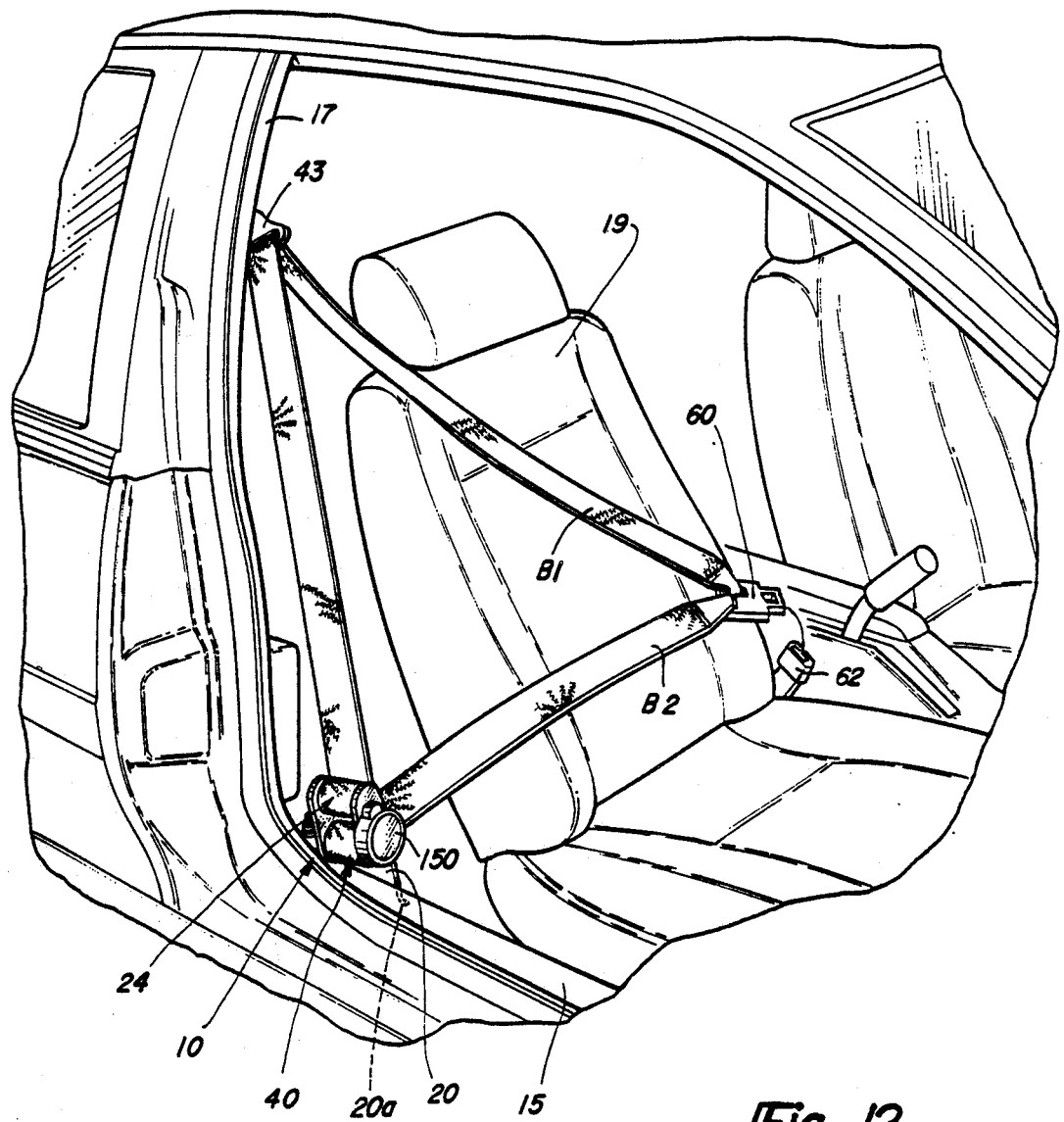
FIG. 12 is an elevation looking toward the door pillar of an automobile showing the first belt and second belt protracted off the retractor of the invention.
Figure 13:
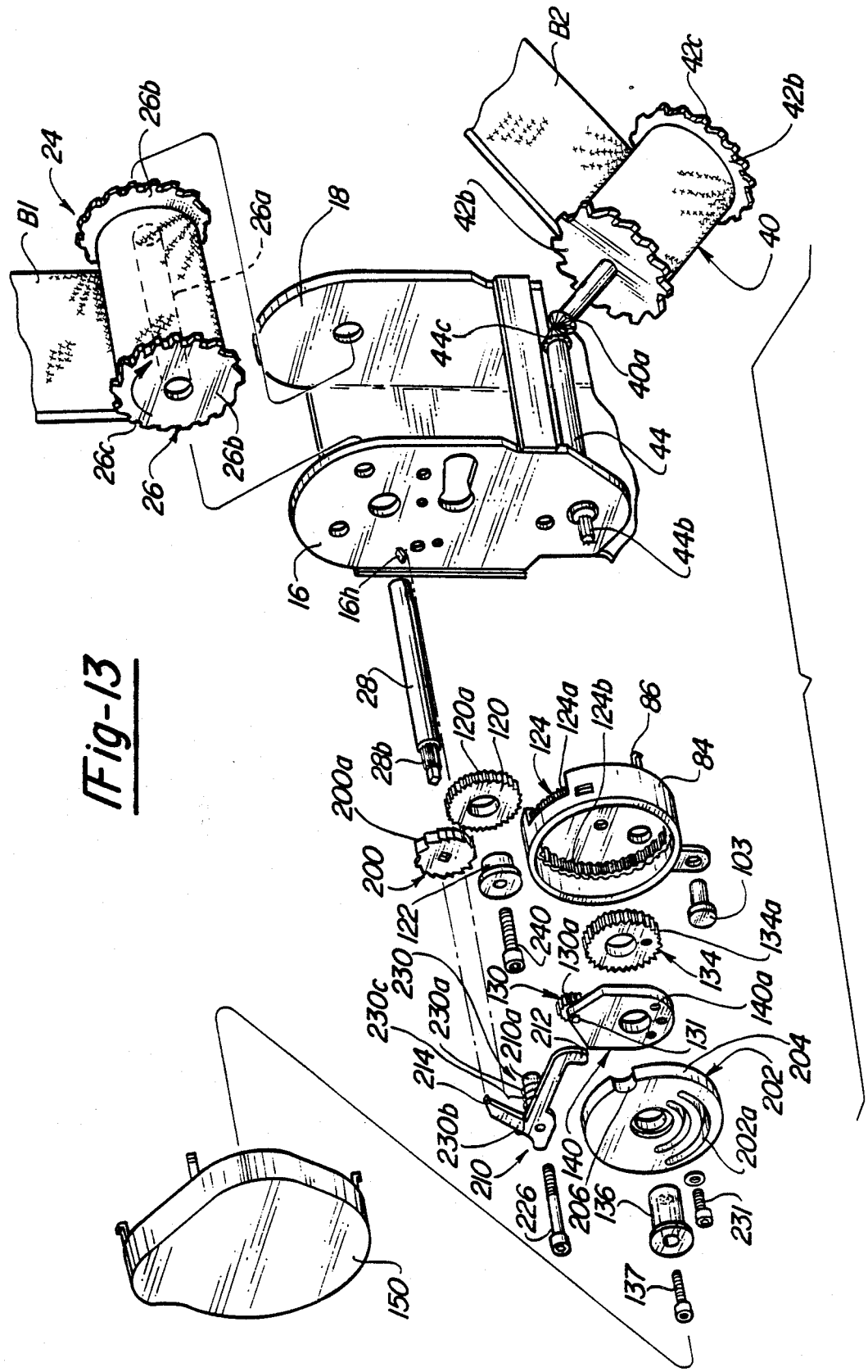
FIG. 13 is an exploded perspective view of still another embodiment of a dual spool retractor of the invention having a comfort setting "memory".
Figure 14:
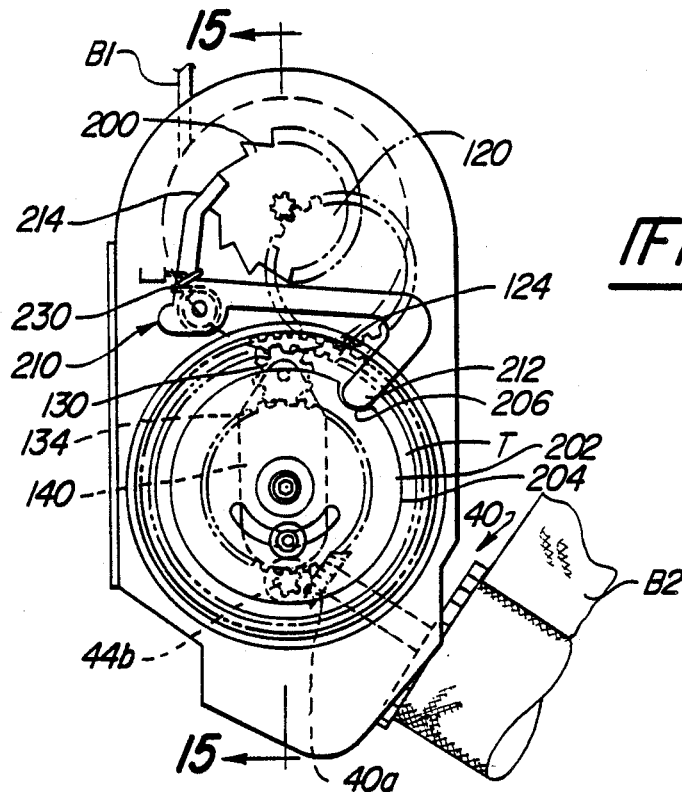
FIG. 14 is an elevation of the retractor of FIG. 13 showing the comfort setting in the "memory" or engaged position. The belt B2 and its spool 40 are shown out of position for clarity.

Referring to FIG. 12, the shoulder or torso belt B1 and lap belt B2 extend from the respective spool means 24,40 to a common metal or rigid tongue 60 to which they are secured in known fashion. Belt B1 extends vertically from frame 14 to a static loop 43 attached on vehicle door pillar 17 and then to tongue 60. Belt B2 extends through a slot 20c in central wall 20 and then to the tongue. The user places tongue 60 in buckle 62 to secure the belts in an initial restraining position around and against the user as is known after the user positions himself or herself in seat 19.

Retractor 10 includes a comfort means or mechanism to permit the user to provide a predetermined amount of slack or reduced tension in the shoulder belt B1. The comfort means includes a plastic scroll plate 70 mounted on one end 26b of spool member 26 for rotation therewith adjacent flange 16 and a spring follower member 74 that includes bent end 74a extending through slot or opening 16b in flange 16 to ride in the plurality of tracks 76,78,80 on the scroll plate, FIG. 5. Spring follower member 74 is pivotally mounted on stud 82 that is integral with cup-shaped cylindrical housing 84 affixed on the flange 16. The spring follower member is biased by spring 90 toward the scroll plate and also radially toward the center of the scroll plate as is known. Track 80 includes three segments each of which have a hook 80a against which follower member 74 is locked to provide a predetermined amount of slack in belt B1. Each hook 80a provides the same predetermined amount of slack in belt B1. Tracks 76,78 and 80 interact with follower member 74 as explained in U.S. Pat. No. 4,002,311 to Fisher et al, the teachings of which are incorporated herein by reference. Three segments of track 80 are used for convenience in actuating the comfort means as is known.

As explained in that patent, the comfort means or mechanism is actuated after the tongue 60 is buckled in buckle 62 by the user's applying limited protraction of belt B1 relative to belt B2. This limited protraction causes spring follower member 74 to contact one of the hooks 80a and block rotation of the scroll plate in the retraction direction and thus spool member 26 from rotation in the retraction direction under bias of spring 30.

The comfort means is designed to provide a predetermined amount of slack in the shoulder belt B1 in response to limited protraction of the belt B1 by the user after the tongue 60 and buckle 62 are buckled or operatively coupled to place belts B1,B2 in the initial restraining position around the user. The predetermined amount of slack in shoulder belt B1 can be selected by suitable design and location of hooks 80a in tracks 80. The comfort mechanism upon actuation after buckling of belts BI,B2 thus provides an adjusted restraining position of belt B1 relative to the user.

As shown best in FIGS. 1,4 and 6,8, spool shafts 28,44 each have an output pinion or gear 28b,44b on an end thereof extending exteriorly of flange 16 and into housing 84. Housing 84 includes compartment 87 with an open bottom adjacent to flange 16 to receive shaft 28 of the first spool means 24 and another opening 88 to receive shaft 44 of second spool means 40. Housing 84 includes a slot 89 to receive the spring follower member 74 and allow pivoting motion thereof as it rides on the scroll plate through opening 16b in flange 16. Housing 84 is affixed in stationary position on flange 16 by integral tabs 86 bent into slots 16c in flange 16 and one or more rivets 103 received in holes 16d in flange 16.

A comfort limiting means or mechanism is actuated by and includes a gear train (or other drive train) drivingly coupled between the output pinions 28b,44b. In particular, the comfort limiting means includes the gear train comprising an idler gear 120 rotatably mounted on stud 122 of housing 84. Teeth 120a of the idler gear mesh with and are driven by output pinion 28b. Idler teeth 120a in turn mesh with exterior teeth 124a on ring gear 124 rotatably supported on the base or bottom 84a of housing 84 which is made of plastic material. Ring gear 124 includes interior teeth 124b that mesh with teeth 130a on a driven planet gear 130 on release member 140.

Output pinion 44b meshes with teeth 134a of a central sun gear 134 rotatably mounted on a central stud 136 of housing 84. Teeth 134a of the sun gear in turn mesh with teeth 130a of driven planet gear 130 diametrically opposite of meshing of teeth 124b with the teeth of the driven planet gear.

Driven gear 130 is rotatably mounted on a stud 131 affixed to the release member 140 for rotation about its own axis defined by stud 131 when ring gear 124 and sun gear 134 rotate simultaneously as will be explained.

Release member 140 includes a central hub 140a that is rotatably mounted on the same stud 136 as the sun gear. When there is relative rotation of ring gear 124 and sun gear 134, driven planet gear 130 will be moved in planetary motion that causes release member to pivot or move angularly about stud 136 for purposes to be explained.

Release member 140 includes inclined cam surfaces 142 thereon that define therebetween a window or opening 144 through which spring follower member 74 extends as shown when the driven planet gear 130 rotates about its axis of rotation an during limited pivotal motion of the release member resulting from limited protraction of the shoulder belt B1 when the comfort mechanism is actuated to provide the predetermined amount of slack in belt B1.

Housing 84 and the components described above located therein ar protected from dirt and damage by a cover 150 that snap fits thereover by tabs 151 engaging slots 16e in flange 16.

Operation of the retractor 10 will now be described. Referring to FIG. 1, the directions of rotation of first and second spool means 24,40 when belts B1,B2 are protracted initially by the user to the initial restraining position (i.e., when tongue 60 is buckled to buckle 62) are shown by arrows P1,P2. It is apparent that spool means 24,40 rotate simultaneously counterclockwise as belts B1,B2 are protracted by the user to effect buckling of tongue 60 in buckle 62. Substantially equal lengths of belts B1 and B2 are protracted from the respective spool means 24,40 as the tongue is so buckled to provide the initial restraining position around the user.

Counterclockwise rotation of spool means 24 causes shaft 28 to rotate in the same direction. Rotation of shaft 28 causes its output pinion 28b to rotate idler gear 120 clockwise which rotates ring gear 124 counterclockwise as shown by the arrow in FIGS. 8-9.

The number of teeth on output pinions 28b,44b, ring gear 124 and sun gear 134 are selected such that driven planet gear 130 is driven equal angular amounts or degrees by the ring gear and sun gear as belts B1,B2 are protracted simultaneously to buckle tongue 60 in buckle 62. Since the ring gear and sun gear both drive the driven planet gear to rotate in the counterclockwise direction in substantially equal angular amounts, the driven planet gear 130 rotates about its rotational axis (defined by stud 131) and remains substantially stationary in the track T defined between the ring gear and sun gear as the belts B1,B2 are protracted equal amounts off the spool members to effect buckling of tongue 60 in buckle 62 to provide the initial restraining position around the user.

During this belt movement, spring follower member 74 rides in track 76 of scroll plate 70 and not in track 80 having hooks 80a. Thus, the comfort mechanism is not engaged or operative at this point.

Figure 4:
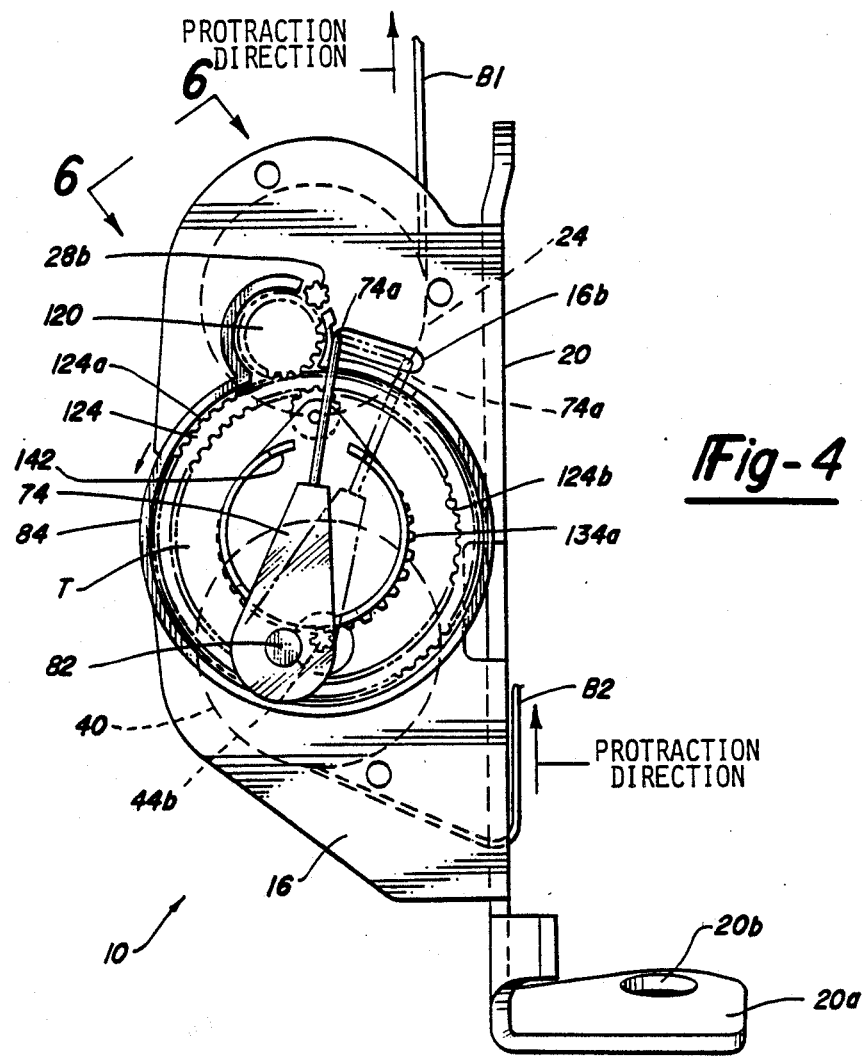
FIG. 4 is an elevation of the retractor in the direction of arrows 4—4 of FIG. 2.
Figure 5:
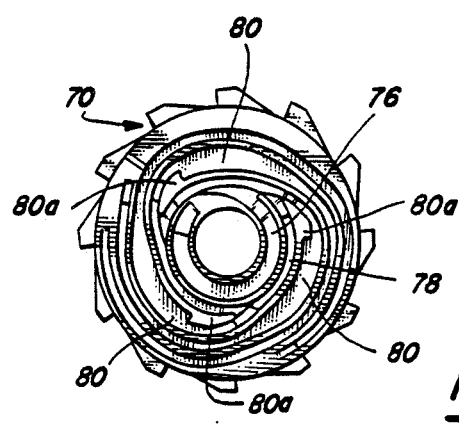
FIG. 5 is an elevation of the track of the comfort mechanism.
Figure 6:
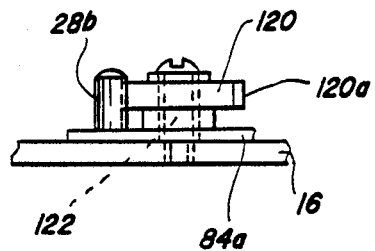
FIG. 6 is a partial elevation projected from FIG. 4.
Figure 7:
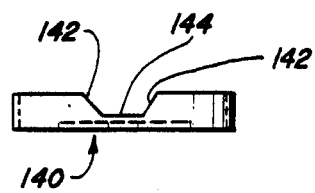
FIG. 7 is an end elevation of the release member of FIG. 1 taken in the direction of arrows 7—7 with the driven planet gear removed.

The gear train ratios for the comfort limiting mechanism can be varied from those shown in FIG. 4 if necessary to change the overall size of the gear train; e.g., to reduce the size of one or more gear train components when space is limited, by changing the diameter of spool hubs 26a,42a and/or by changing the diameter of belts B1,B2 provided or stored on the spool hubs.

Figure 8:
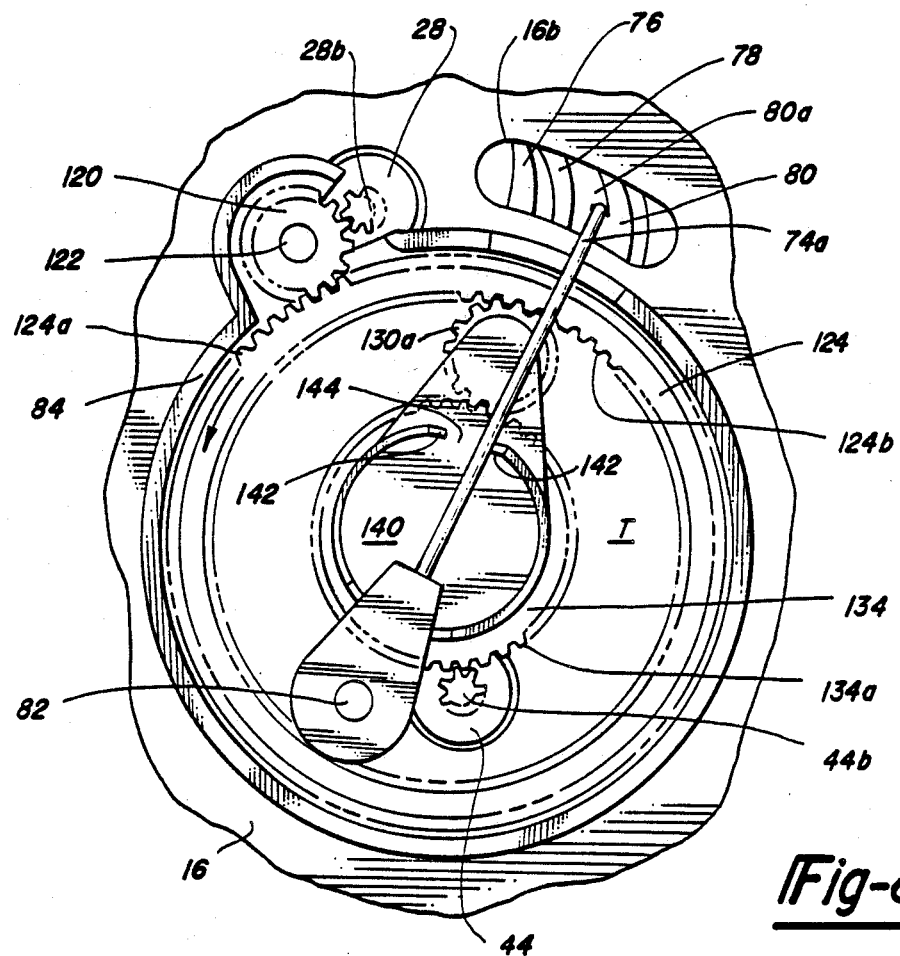
FIG. 8 is an enlarged partial elevation of the retractor of FIG. 4 showing the comfort mechanism engaged to provide predetermined amount of slack in the shoulder or torso belt.

The comfort mechanism is actuated by the user once the tongue 60 and buckle 62 are coupled by limited protraction of shoulder belt B1 by the user's pulling the belt (or the user's leaning forward) relative to belt B2 to cause limited protraction of belt B1 relative to belt B2 to cause spring follower member 74 to leave track 76 and enter one of the tracks 80 and engage the hook 80a therein upon release of belt B1 or upon the user's leaning backward, FIG. 8, all as known in accordance with U.S. Pat. No. 4,002,311 referred to hereinabove. Actuation of the comfort mechanism provides a predetermined amount of slack (or reduced tension) in shoulder belt B1 as dictated by the position of hook 80a.

As shoulder belt B1 is protracted relative to lap belt B2 to actuate the comfort mechanism, first spool means 24 will be rotated relative to second spool means 40 which remains stationary. Rotation of the first spool means causes output pinion 28b to drive ring gear 124 counterclockwise. Ring gear 124 in turn rotates driven planet gear 130 about the sun gear 134 which is stationary since the second spool means is stationary. Rotation of ring gear 124 relative to sun gear 134 causes the driven planet gear 130 to move in planetary motion around the sun gear. Planetary motion of the driven planet gear moves release member 140 in limited pivotal or angular fashion about stud 136 relative to spring follower member 74. Window or opening 144 is configured or dimensioned to accommodate this limited pivotal or angular movement of the release member relative to the spring follower member to allow the comfort mechanism to be engaged and provide the predetermined slack in shoulder belt B1 as controlled by engagement between hook 80a in one of tracks 80 and the follower member 74.

Figure 9:
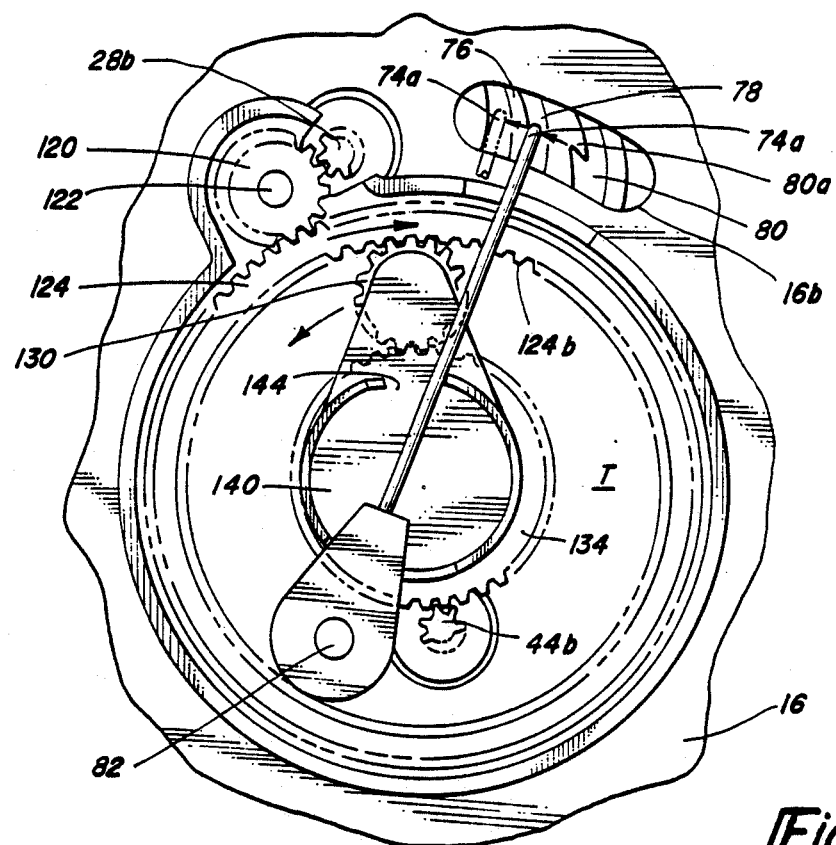
FIG. 9 is similar to FIG. 8 with the comfort mechanism disengaged by the release member.

However, if the user intentionally or inadvertently protracts shoulder belt B1 beyond the limited protraction required to provide the predetermined amount of slack and accommodated by window 144, the rotation of ring gear 124 relative to the sun gear will drive driven planet gear 130 in planetary fashion to an extent to cause one cam surface 142 to engage spring follower member 74 to lift it out of track 80, see FIG. 9. The height of cam surfaces 142 above hub 140a is selected to this end. Spring 90 will then return the spring follower member to track 76 (see phantom position in FIG. 9) so that torsion spring 30 can and will retract belt B1 until the belt B1 engages tight against the user's torso. As a result, slack in belt B1 in excess of the predetermined amount dictated by hook 80a cannot be obtained and will be prevented by the release member 140 of the comfort limiting mechanism.

Thus, belt B1 will be either retracted against the user's torso or provided with only the predetermined amount of slack established by one of the hooks 80a when in use. The comfort mechanism is released by protraction of belt B1, however minimal or great, beyond the limited protraction required to actuate the comfort mechanism. The minimal amount of protraction of belt B1 to cause the comfort limiting means to disengage the comfort means is dictated by the configuration of cam surfaces 142 and window 144.

If the user causes disengagement of the comfort means by release member 140, the user must repeat the protraction of shoulder belt B1 to apply only the limited protraction necessary to actuate the comfort mechanism. Upon actuation, only the predetermined amount of slack in belt B1 is achievable by the user. As mentioned hereinabove, the predetermined amount of slack in belt B1 is dictated by the location of hook 80a and can be controlled by location of the hook in tracks 80.

Of course, the locking pawl 50 will actuate in normal fashion in the event of deceleration of the vehicle to restrain belts B1,B2 from protraction with the comfort mechanism disengaged or engaged as described to provide the predetermined amount of slack in belt B1.

The comfort limiting mechanism is also operable to disengage the comfort mechanism when tongue 60 is unbuckled from buckle 62. For example, upon unbuckling tongue 60, belt B2 will be immediately retracted on the second spool means 40 by rewind spring 46. Rotation of the second spool means will cause sun gear 134 to rotate counterclockwise while ring gear 124 initially remains stationary as a result of the spring follower member 74 and hook 80a preventing rotation of the scroll plate 70 and first spool means 24. However, rotation of the sun gear relative to the ring gear moves driven planet gear 130 in planetary fashion in track T to an extent to cause the other cam surface 142 to pivot release member 140 to disengage the spring follower member from track 80. The spring follower member is lifted from the track and returns to track 76. Of course, this disengagement allows rewind spring 30 to retract belt B1 fully on the first spool means.

Thus, the comfort limiting means releases the comfort mechanism not only when protraction of belt B1 relative to belt B2 exceeds the limited protraction required to actuate the comfort mechanism but also when belt B2 is retracted relative to belt B1 by rewind spring 46 after initial unbuckling of tongue 60.

Figure 10:
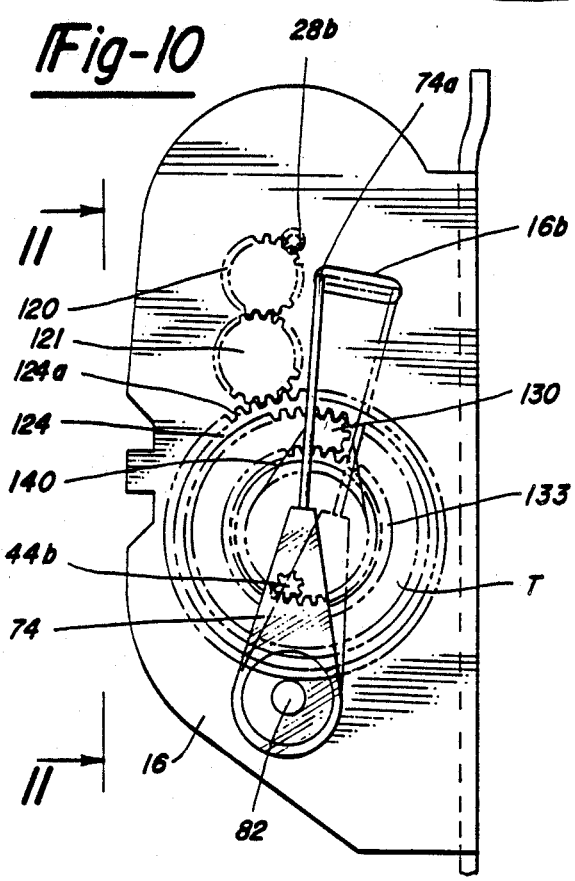
FIG. 10 is an elevation similar to FIG. 4 of a second embodiment of the retractor of the invention.
Figure 11:
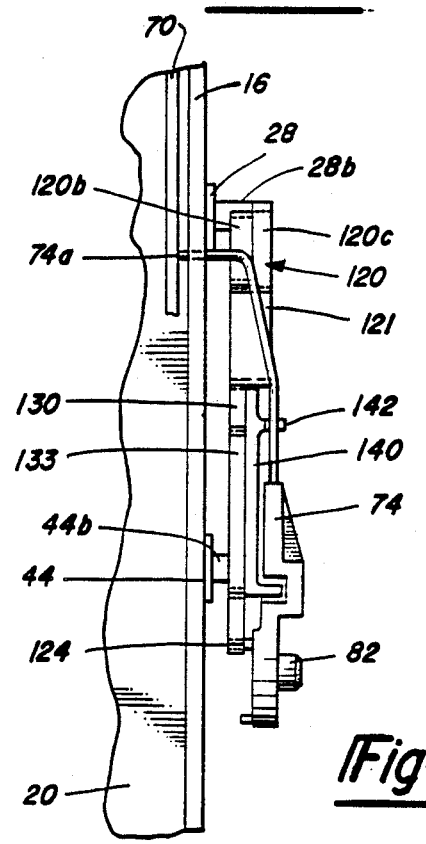
FIG. 11 is an elevation of the retractor of FIG. 10 along arrows 11—11 with portions of ring gear 124 deleted to show driven planet gear 130.

Referring to FIGS. 10-11, another embodiment of the retractor of the invention is illustrated wherein like features of previous figures bear like reference numerals. This embodiment differs from that shown in FIGS. 1-9 in that the driven gear 130 of the release member 140 can be moved in planetary fashion around the entire (360°) track T. To this end, output pinion 28b of first spool means 24 drives a first idler gear 120 which in turn drives a second idler gear 121. Idler gear 121 in turn drives ring gear 124 as in the first embodiment shown in FIGS. 1-9. In particular, idler gear 120 includes a lower smaller diameter toothed portion 120b that meshes with pinion 28b and an upper larger diameter toothed portion 120c that meshes with second toothed idler gear 121. Idler gear 121 in turn meshes with exterior teeth 124a of ring gear 124. Ring gear 124 meshes with driven planet gear 130 on release member 140.

Output pinion 44b of the second spool means 40 drives central ring sun gear 133 which is used in lieu of the sun gear of the first embodiment so that output pinion 44b can be located inside ring gear 33 out of the track T. It is clear that ring gear 133 has exterior teeth that drive driven planet gear 130 diametrically opposite the teeth of ring gear 124.

Spring follower member 74 is pivotally mounted on a stud 82 extending from flange 16 outside track T instead of extending from housing 84 in track T as in the first embodiment.

Although not shown in FIGS. 10-11, a housing and cover similar to housing 84 and cover 150 of FIG. 1 would be used to enclose and support in the same manner the components of the comfort mechanism and comfort limiting mechanism of the second embodiment.

Operation of the second embodiment of FIGS. 10-11 is identical to the first embodiment of FIGS. 1-9 except that the second embodiment can accommodate unlimited protraction and retraction of belts B1,B2 by virtue of driven planet gear 130 being movable in 360° planetary fashion in track T. In the first embodiment of FIG. 1-9, planetary motion of driven planet gear 30 in track T is limited by stud 82 on which the spring follower member is pivoted and by output pinion 44b, both of which extend into track T.

Referring to FIGS. 13-18, a third embodiment of the retractor of the invention is illustrated wherein similar features of previous figures bear like reference numerals. This embodiment differs from those shown in FIGS. 1-11 in several respects. Most notably, this embodiment includes a comfort means or mechanism that provides a repeatable comfort setting providing the same predetermined amount of slack in the shoulder belt B1 upon protraction of the belt B1 after the tongue 60 is buckled in the buckle 62 by the user's applying limited protraction of belt B1 relative to belt B2, even if such protraction exceeds the limited protraction required to engage the comfort setting.

In particular, the comfort mechanism with "memory" of the comfort setting includes a ratchet wheel 200 attached on the first spool means 24 for rotation therewith, a rotatable disk release member 202 having a comfort setting slot 206 thereon and a pivotable pawl member or lever 210 having a cam end 212 engageable in the slot 206 and a pawl end 214 engageable with the teeth 200a of the ratchet wheel 200 to lock the ratchet wheel 200 to prevent retraction of the first belt B1 relative to the second belt B2 and thereby establish the comfort setting. The disk release member 202 is rotated by a gear train to be described by relative rotation between the first and second spool means 24 and 40 as will be explained hereinbelow.

The comfort limiting means or mechanism includes the outer peripheral circular track 204 disposed on the disk release member 202 adjacent the comfort setting slot 206 for rotation therewith by the same gear train and configured to disengage the pawl end 214 from the ratchet wheel 200 when the first belt B1 is protracted relative to the second belt B2 in excess of the comfort setting or when the second belt B2 is protracted or retracted relative to the first belt B1.

In this third embodiment, the components of both the comfort mechanism and of the comfort limiting mechanism are actuated by the same gear train which is operably drivingly coupled between and driven by the output pinions 28b, 44b of the first and second spool shafts 28, 44. The shaft 44 includes a bevel gear 44c driven in rotation by a bevel output gear 40a on the second spool means 40 which is inclined relative to first spool means 24 to accommodate available space in the vehicle. The second spool means 40 is rotatably supported in another U-shaped frame (not shown) similar to frame 14.

In this third embodiment, the gear train includes idler gear 120 rotatably mounted on stud 122 that is fastened by screw 240 to flange 16. Teeth 120a of the idler gear mesh with and are driven by output pinion 28b. Idler teeth 120a in turn mesh with exterior teeth 124a of the ring gear 124 rotatably supported on the base of the plastic housing 84. Ring gear 124 includes interior teeth 124b that mesh with teeth 130a on the driven planet gear 130 on the disk carrier member 140 (i.e., member 140 carries disk release member 202 thereon).

Output pinion 44b meshes with teeth 134a of the sun gear 134 rotatably mounted on the stud 136. Teeth 134a of the sun gear mesh with teeth 130a of the driven planet gear 130 diametrically opposite of meshing of teeth 124b with the teeth of ring gear 124.

The pivotable pawl member (pawl lever) 210 includes a hollow hub 210a through which a shouldered screw 226 extends to pivotably mount the member 210 on the flange 16. A biasing spring 230 includes a coiled portion 230a around the hub 210a, a first end 230b engaged on the pawl end 214 and a second end 230c attached on tab 16h of the flange 16.

The number of teeth on output pinions 28b,44b, ring gear 124 and sun gear 134 are selected such that driven planet gear 130 is driven equal angular amounts or degrees by the ring gear and sun gear as belts B1,B2 are protracted simultaneously to buckle tongue 60 in buckle 62. Since the ring gear and sun gear both drive the driven planet gear to rotate in the clockwise direction in substantially equal angular amounts, the driven planet gear 130 rotates about its rotational axis (defined by stud 131) and remains substantially stationary in the track T defined between the ring gear and sun gear as the belts B1,B2 are protracted equal amounts off the spool members to effect buckling of tongue 60 in buckle 62 to provide the initial restraining position around the user. During this belt movement, the cam end 212 is not engaged in the slot 206 and the pawl end 214 is not engaged with the ratchet wheel 200 so that the ratchet wheel 200 is free to rotate.

Figure 16:
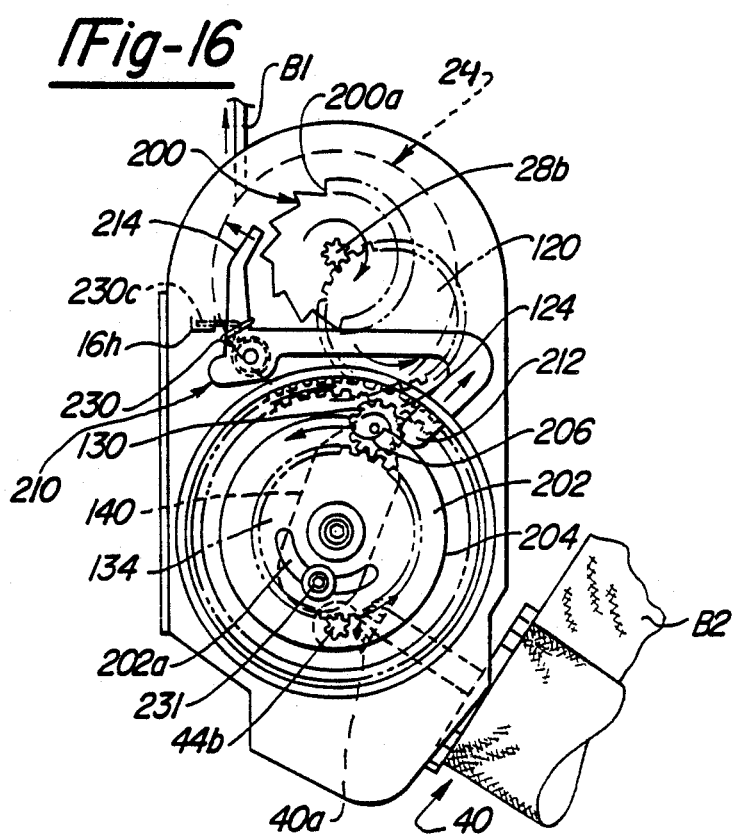
FIG. 16 is an elevation of the retractor similar to FIG. 14 after the tongue 60 and buckle 62 are coupled with the comfort setting disengaged.
Figure 15:
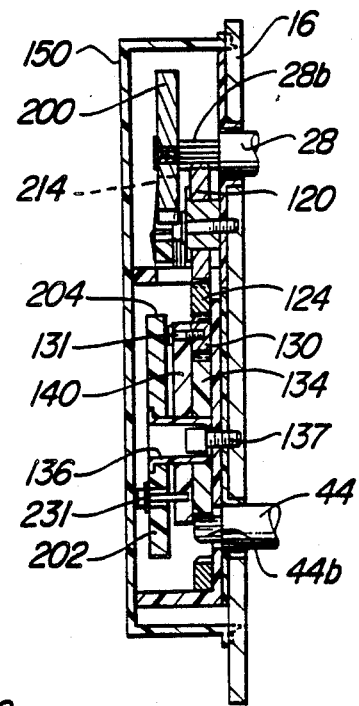
FIG. 15 is a cross-sectional view taken along lines 15—15 of FIG. 14.

Operation of the retractor of FIGS. 13–18 will now be described. Referring to FIG. 16, the position of the disk release member 202, pivotable pawl member 210 and ratchet wheel 200 are shown after the tongue 60 has been buckled to the buckle 62 by the user. It is apparent that the cam end 212 of the pivotable member 210 is riding on the comfort limiting track 204 and that, as a result, the pivotable member 210 is rotated or pivoted counterclockwise against the bias of spring 230 such that the comfort limiting pawl end 214 is disengaged from the ratchet wheel 200. In this position, the belts B1, B2 are retracted against the user's torso (by the torsion return springs 30, 46 see FIG. 1).

The comfort mechanism is actuated by the user, once the tongue 60 and buckle 62 are coupled, by limited protraction of shoulder belt B1 by the user's pulling the belt (or the user's leaning forward) relative to belt B2 to cause limited protraction of belt B1 relative to belt B2 to cause the carrier member 140 and disk release member 202 thereon to rotate clockwise (see arrows FIG. 18) relative to the cam end 212 to move the slot 206 to the cam end 212. Upon release of belt B1, the cam end 212 will be either engaged in the slot 206 or, if the slot 206 is moved past the cam end 212, the disk release member will be biased (by return spring 30) to move slot 206 into engagement with the cam end 212. Engagement of the cam end 212 and the slot 206 allows pawl end 214 to engage and lock ratchet wheel 200, FIG. 14, against rotation in the retraction direction and thereby establish the comfort setting so as to provide a predetermined amount of slack (or reduced tension) in shoulder belt B1 as dictated by the position of slot 206 on the periphery of the disk release member 202. An adjustment slot 202a in disk release member 202 and adjustment screw 231 (threadable into one of several holes 140a in carrier member 140) are provided to vary orientation of the disk release member 202 relative to the carrier member 140 and thus the position of slot 206 for adjusting the comfort setting (i.e. the amount of slack in belt B1).

In particular, as shoulder belt B1 is protracted relative to lap belt B2 to actuate the comfort mechanism, first spool means 24 will be rotated relative to second spool means 40 which remains stationary. Rotation of the first spool means causes output pinion 28b to drive ring gear 124 clockwise, FIG. 18. Ring gear 124 in turn rotates driven planet gear 130 clockwise about the sun gear 134 which is stationary since the second spool means 40 is stationary. Rotation of ring gear 124 relative to sun gear 134 causes the driven planet gear 130 to move in clockwise planetary motion around the sun gear and thereby to rotate the carrier member 140 and disk release member 202 thereon in clockwise direction as discussed in the preceding paragraph to actuate the comfort mechanism.

If, after the comfort setting is engaged, the user intentionally or inadvertently attempts to protract shoulder belt B1 beyond the limited protraction required to provide the predetermined amount of slack, the disk release member 202 will be rotated clockwise and position cam end 212 on the track 204 and result in disengagement of the pawl end 214 from the ratchet wheel 200. When the protraction force on the belt B1 is released, the return spring 30 will rotate first spool means 24 and thus the disk release member 202 through the gear train described above in the retraction direction (counterclockwise) until slot 206 and the cam end 212 reengage, thus reengaging pawl end 214 and the ratchet wheel 200 and locking the belt B1 at the same comfort setting. As a result slack in belt B1 in excess of the predetermined amount cannot be obtained by the user and will instead always be the same repeatably amount as provided by the comfort setting.

Figure 17:
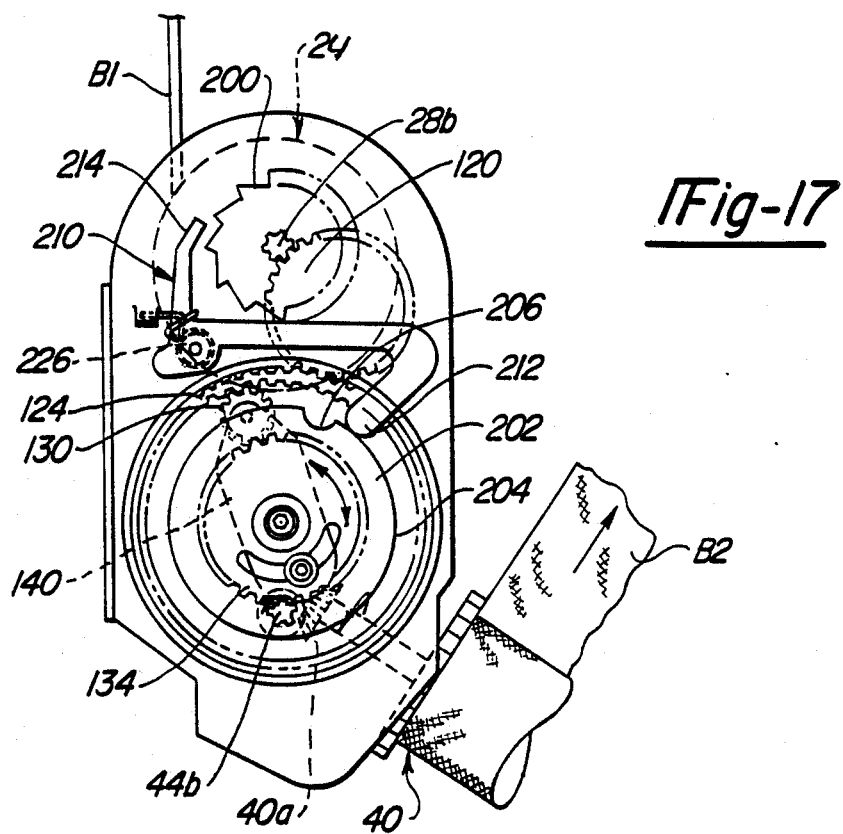
FIG. 17 is an elevation of the retractor similar to FIG. 14 but with the lap belt protracted to disengage the comfort setting.
Figure 18:
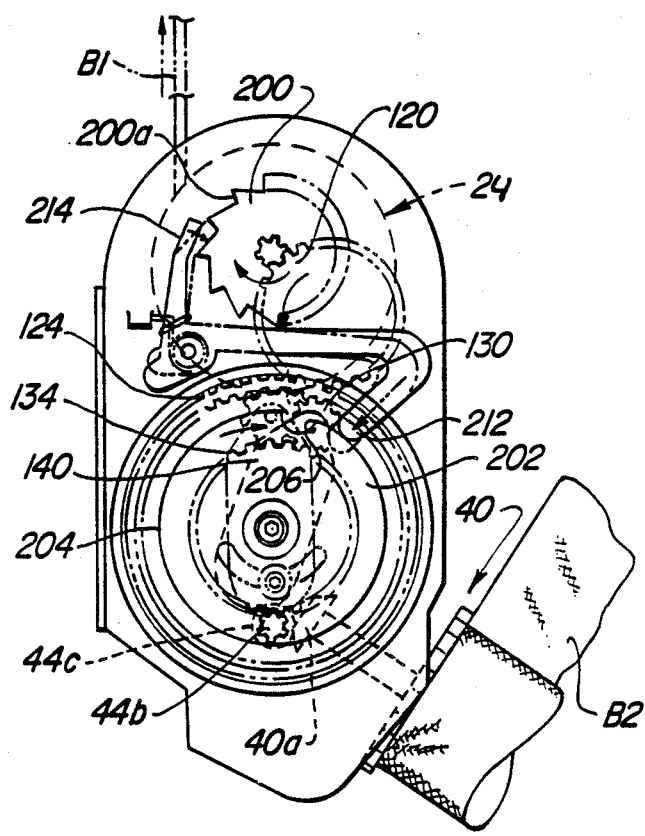
FIG. 18 is an elevation of the retractor similar to FIG. 16 showing, in solid lines, the comfort setting slot and cam end disengaged and, in phantom, the comfort setting slot and cam end engaged, the arrows indicating directions of movement from the disengaged to the engaged positions.

If the user desires to release the comfort setting and has the belt B1 biased against his torso, the user protracts belt B2 relative to the belt B1, FIG. 17, to rotate the disk release member 202 counterclockwise as shown to disengage the slot 206 and the cam end 212 and position the cam end 212 on the comfort limiting track 204 such that the pawl end 214 disengages from the ratchet wheel 200. Whereupon, the first spool means 24 is free to rotate in the counterclockwise retraction direction until the belt B1 is retracted against the user's torso since the ratchet wheel 200 is free for rotation by return or rewind spring 30 in the counterclockwise (retraction) direction (i.e. the pawl end 214 is disengaged from the ratchet wheel 200). At the same time, the disk release member 202 rotates in the counterclockwise direction. Upon release of the belt B2, the second spool means 40 is rotated in the counterclockwise retraction direction (by return spring 46 in FIG. 1) to retract the belt B2 against the user's torso and the disk release member 202 is rotated in the clockwise direction.

Thus, belt B1 will be either retracted against the user's torso or provided with only the predetermined amount of slack established by engagement of slot 206 and cam end 212 when in use; i.e. the comfort setting.

The comfort limiting track 204 is also operable to disengage the comfort mechanism when tongue 60 is unbuckled from buckle 62. For example, upon unbuckling tongue 60, belt B2 will be immediately retracted on the second spool means 40 by rewind spring 46. Rotation of the second spool means relative to the first spool means 24 will cause the disk release member 202 to be rotated clockwise and disengage slot 206 and cam end 212 and position cam end 212 on the track 204. When the tongue 60 is released, rewind spring 46 can retract the belt B2 and rewind spring 30 can retract belt B1 in the same manner as described for FIG. 17 to fully retracted positions on first and second spool means 24, 40 since the pawl end 214 is disengaged from the ratchet wheel 200.

Thus, the comfort limiting means releases the comfort mechanism not only when protraction of belt B1 relative to belt B2 exceeds the limited protraction required to actuate the comfort mechanism but also when belt B2 is retracted relative to belt B1 after initial unbuckling of tongue 60.

Of course, the locking pawl 50 will actuate in normal fashion in the event of deceleration of the vehicle to restrain belts B1,B2 from protraction with the comfort mechanism disengaged or engaged as described to provide the predetermined amount of slack in belt B1.

The dual spool retractors of the invention described hereinabove are advantageous in that the seat 19 can be moved to its full forward or full rearward position by the user without affecting operation of the retractor. Both the comfort mechanism and comfort limiting mechanism accommodate such seat movement and yet maintain their intended functions described above. Similarly, the size of the seat occupant, whether small or large, can be accommodated by the comfort mechanism and comfort limiting mechanism while maintaining their intended functions.

The accommodation of the above two conditions results from the fact that when both the seat belt and shoulder belt are extended or retracted simultaneously the gear train maintains the position of the driven planet gear 130 in the same location and consequently the position of the engaging slot 206 does not change during these operations.

It is to be understood that variations and modifications may be made to the specific embodiments disclosed herein without departing from the scope of the invention and that the invention is not to be limited by the specific embodiments disclosed herein and instead is defined by the appended claims.

We claim:

1. A dual spool retractor having a first rotatable spool means and second rotatable spool means for storing a respective first belt and second belt, means for biasing the first spool means and second spool means in a direction to retract the respective first belt and second belt, comfort means operatively associated with the first spool means for actuation by limited protraction of the first belt relative to the second belt to provide a predetermined amount of slack in said first belt, comfort limiting means actuated by a drive train drivingly coupled between the first spool means and second spool means for disengaging the comfort means and allowing retraction of said first belt in response to rotation of said first spool means relative to the second spool means caused by protraction of the first belt relative to the second belt to an extent exceeding said limited protraction to prevent slack in said first belt greater than said predetermined amount.

2. The retractor of claim 1 wherein the comfort limiting means is operable to disengage the comfort means and allow retraction of said first belt in response to rotation of said second spool means relative to the first spool means caused by retraction of the second belt relative to the first belt.

3. The retractor of claim 1 or 2 wherein the comfort limiting means includes a movable release member coupled by the drive train between the first spool means and second spool means and movable by the drive train as a result of rotation of the first spool means or second spool means to disengage the comfort means to allow retraction of said first belt.

4. The retractor of claim 3 wherein said release member includes a driven planet gear drivingly coupled to the first spool means and second spool means by a gear train constituting said drive train.

5. The retractor of claim 4 wherein the gear train effects rotation of the driven planet gear about its own rotational axis when the first spool means and second spool means are rotated simultaneously by protraction of said first belt and second belt simultaneously and effects planetary motion of said driven planet gear about another axis when the first spool means and second spool means are relatively rotated.

6. The retractor of claim 5 wherein said release member remains substantially stationary when the driven planet gear rotates about its own rotational axis and pivots about said another axis when the driven planet gear is moved in planetary motion.

7. The retractor of claim 6 wherein the pivoting movement of the release member effects disengagement of said comfort means when protraction of said first belt exceeds said limited protraction.

8. The retractor of claim 3 wherein said comfort means further includes a follower member riding in a track rotatable with said first spool means and said release member includes an opening configured to receive the follower member and permit said follower member to ride in the track when the release member is substantially stationary and when the release member is pivoted during said limited protraction of said first belt and further includes a cam surface to disengage the follower member from the track to disable the comfort means when said limited protraction is exceeded.

9. The retractor of claim 8 wherein said opening is configured to permit said follower member to ride in the track when the release member is pivoted during limited retraction of said second belt relative to said first belt and includes a cam surface to disengage the follower member from the track when said limited retraction is exceeded.

10. A dual spool retractor having a first rotatable spool means and second rotatable spool means for storing a respective first belt and second belt, means for biasing the first spool means and second spool means in a direction to retract the respective first belt and second belt, comfort means having a track rotatable with the first spool means and a follower member engaged in the track for actuation by limited protraction of the first belt relative to the second belt to provide a predetermined amount of slack in said first belt, comfort limiting means drivingly coupled to the first spool means and second spool means for disengaging the follower member when protraction of the first belt relative to the second belt exceeds said limited protraction to allow retraction of the first belt to prevent slack in said first belt greater than said predetermined amount, said comfort limiting means comprising a release member mounted for pivotable movement about an axis to disengage the follower member from the track and a driven planet gear rotatably disposed on said release member, said driven planet gear being drivingly coupled to said first spool means and second spool means such that said driven planet gear rotates in substantially stationary position when the first spool means and second spool means rotate simultaneously as said first belt and second belt are simultaneously protracted substantially equal amounts and moves in planetary motion about said axis to pivot said release member relative to said follower member when said first spool means rotates relative to said second spool means as said first belt is protracted relative to said second belt, said release member being configured to disengage said follower member from the track when protraction of said first belt exceeds said limited protraction.

11. The retractor of claim 10 wherein the comfort limiting means is also operable to disengage the comfort means and allow retraction of said first belt in response to rotation of said second spool means relative to the first spool means caused by retraction of the second belt relative to the first belt.

12. The retractor of claim 10 wherein said release member includes an opening configured to receive said follower member and permit said follower member to ride in said track during limited protraction of said first belt and a cam surface to disengage said follower member from said track when protraction of said first belt exceeds said limited protraction.

13. The retractor of claim 10 wherein said driven planet gear is drivingly coupled to the first spool means and second spool means by a gear train comprising (a) a central sun gear driven by an output gear on the second spool means and in driving relation to said driven planet gear and (b) a ring gear concentric around said sun gear in driving relation to said driven planet gear, said ring gear being driven on the exterior by an output gear on the first spool means and being in driving relation to said driven planet gear on the interior, said driven planet gear moving in planetary fashion around the sun gear when one of said first spool means and second spool means rotates relative to the other.

14. The retractor of claim 13 wherein the rotational axis of the sun gear and said axis of the release member are coaxial.

15. A dual spool retractor having a first rotatable spool means and second rotatable spool means for storing a respective first belt and second belt, means for biasing the first spool means and second spool means in a direction to exert a retraction force on the respective first belt and second belt, comfort means operatively associated with the first spool means for providing a predetermined amount of slack in said first belt, comfort limiting means actuated by a drive train drivingly coupled between the first spool means and the second spool means for disengaging the comfort means to allow a retraction force to be exerted on said first belt in response to a selected relative rotation between the first spool means and second spool means as a result of movement of one of said first belt or second belt relative to the other.

16. A dual spool retractor having a first rotatable spool means and second rotatable spool means for storing a respective first belt and second belt, means for biasing the first spool means and second spool means in a direction to retract the respective first belt and second belt, comfort means actuated by a drive train drivingly coupled between the first spool means and the second spool means in response to limited protraction of the first belt relative to the second belt and operatively associated with said first spool means for establishing a repeatable comfort setting providing a predetermined amount of slack in said first belt at said comfort setting, and comfort limiting means actuated by the drive train for allowing retraction of said first belt back to said comfort setting in response to rotation of said first spool means relative to the second spool means caused by protraction of the first belt relative to the second belt to an extent exceeding said limited protraction to thereby prevent slack in said first belt greater than said predetermined amount, whereby a repeatable comfort setting providing said predetermined amount of slack in said first belt is provided.

17. The retractor of claim 16 wherein the comfort limiting means is operable to allow retraction of said first belt against the torso of the user in response to rotation of said second spool means relative to the first spool means.

18. The retractor of claim 16 wherein the comfort means comprises a ratchet wheel rotatable with the first spool means, a slot rotatable by the drive train in response to rotation of the first spool means relative to the second spool means in the protraction direction caused by protraction of the first belt relative to the second belt and a pivotable pawl member between the first spool means and the second spool means, said pivotable pawl member having a cam end engageable in said slot to establish said comfort setting and having a pawl end engageable with the ratchet wheel to lock said first spool means against rotation in the retraction direction when said cam end is engaged in said slot to thereby establish said comfort setting.

19. The retractor of claim 18 wherein the comfort limiting means comprises a track disposed adjacent said slot for rotation therewith by the drive train and configured to disengage said pawl end from said ratchet wheel in response to rotation of said first spool means relative to said second spool means caused by protraction of said first belt relative to said second belt to an extent exceeding said limited protraction whereby the first spool means is freed for rotation in a retraction direction to return said first belt to said comfort setting.

20. The retractor of claim 19 wherein the track and the slot are formed on a disk release member that is rotated by the drive train coupled between the first and second spool means.

21. The retractor of claim 20 wherein the track has a circular profile.

22. The retractor of claim 20 wherein the disk release member is rotated by a driven planet gear drivingly coupled between the first and second spool means by a gear train constituting said drive train.

23. The retractor of claim 22 wherein the gear train effects rotation of the driven planet gear about its own rotational axis when the first spool means and second spool means are rotated simultaneously by protraction of the first belt and second belt simultaneously and effects planetary motion of said driven planet gear about another axis when the first spool means and second spool means are relatively rotated, said planetary motion causing rotation of said disk release member.

24. A dual spool retractor having a first rotatable spool means and second rotatable spool means for storing a respective first belt and second belt, means for biasing the first spool means and second spool means in a direction to retract the respective first belt and second belt, a ratchet wheel rotatable with the first spool means, a rotatable disk release member having a track and a slot in the track, a gear train coupled between the first spool means and the second spool means for rotating the disk release member, and a pivotable pawl member disposed between the first and second spool means, said pivotable pawl member having a cam end engageable in the slot and a pawl end engageable with the ratchet wheel to prevent rotation of the ratchet wheel in the retraction direction when the cam end and slot are engaged to establish a repeatable comfort setting providing a predetermined amount of slack in the first belt, said disk release member being rotatable by the gear train in response to rotation of the first spool means in the protraction direction relative to the second spool means caused by protraction of the first belt relative to the second belt in excess of said comfort setting so as to position the cam end on the track and pivot the pivotable pawl member to disengage the pawl end from the ratchet wheel whereby a retraction force is exerted on the first belt to return it to the comfort setting.

25. The retractor of claim 24 wherein the disk release member is rotatable by the gear train in response to rotation of the second spool means relative to the first spool means as a result of protraction or retraction of the second belt relative to the first belt to position the cam end on the track and pivot the pivotable pawl member to disengage the pawl end thereof from the ratchet wheel whereby a retraction force is exerted on the first belt and second belt to retract them onto the respective first and second spool means.

26. The retractor of claim 24 wherein the disk release member is rotated by a driven planet gear drivingly coupled between the first spool means and second spool means by the gear train.

27. The retractor of claim 26 wherein the gear train effects rotation of the driven planet gear about its own rotational axis when the first spool means and second spool means are rotated simultaneously by protraction of the first belt and second belt simultaneously and effects planetary motion of said driven planet gear about another axis when the first spool means and second spool means are relatively rotated, said planetary motion causing rotation of said disk release member.

28. A dual spool retractor having a first rotatable spool means and a second rotatable spool means for storing a respective first belt and second belt, means for biasing the first spool means and the second spool means in a direction to retract the respective first belt and second belt, a comfort mechanism actuated in response to rotation of the first spool means relative to the second spool means as a result of selected limited protraction of the first belt relative to the second belt to lock the first spool means against rotation in the retraction direction and thereby establish a comfort setting providing a predetermined amount of slack in the first belt, a drive train coupled between the first spool means and the second spool means for actuating the comfort mechanism in response to said limited protraction of said first belt, and a comfort limiting mechanism actuated by the drive train to disengage the comfort means in response to rotation of the first belt in excess of said limited protraction to unlock said first spool means for rotation in the retraction direction and permit return of the first belt to the comfort setting.

29. A dual spool retractor having a first rotatable spool means and a second rotatable spool means for storing a respective first belt and second belt, means for biasing the first spool means and the second spool means in a direction to retract the respective first belt and second belt, a ratchet wheel rotatable with the first spool means, a rotatable disk release member having a track, a gear train coupled between the first spool means and second spool means for rotating the disk release member in response to relative rotation between the first spool means and the second spool means, and a pivotable pawl member disposed between the first spool means and the second spool means, said pivotable pawl member having a cam end engageable in the slot and a pawl end engageable with the ratchet wheel to prevent rotation of the ratchet wheel in the retraction direction when the cam end and the slot are engaged to establish a repeatable comfort setting providing a predetermined amount of slack in the first belt, said disk release member being rotatable by the gear train in response to relative rotation between the first spool means and the second spool means as a result of movement of one of said first belt or second belt relative to the other to rotate said track in a direction to disengage the cam end and the slot and position said cam end on said track such that a retraction force is exerted on said first belt.

* * * * *

UNITED STATES PATENT AND TRADEMARK OFFICE
CERTIFICATE OF CORRECTION

PATENT NO. : 4,896,844

DATED : January 30, 1990

INVENTOR(S) : James A. Gavagan et al

It is certified that error appears in the above-identified patent and that said Letters Patent is hereby corrected as shown below:

```
Column  7, line 68, delete "an" and insert therefor --and--.
Column  8, line  6, delete "ar" and insert therefor --are--.
Column 15, line 61, delete "the" and
                    insert therefor --said--.
Column 15, line 62, delete "the" and
                    insert therefor --said--.
```

Signed and Sealed this

Seventh Day of January, 1992

Attest:

HARRY F. MANBECK, JR.

*Attesting Officer*    *Commissioner of Patents and Trademarks*